US012645414B2

(12) United States Patent　　(10) Patent No.: US 12,645,414 B2
Tanigawa et al.　　(45) Date of Patent: Jun. 2, 2026

(54) INFORMATION PROCESSING METHOD, INFORMATION PROCESSING DEVICE, AND NON-TRANSITORY COMPUTER READABLE RECORDING MEDIUM

(71) Applicant: Panasonic Intellectual Property Corporation of America, Torrance, CA (US)

(72) Inventors: Risako Tanigawa, Kanagawa (JP); Kazuki Kozuka, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 18/948,072

(22) Filed: Nov. 14, 2024

(65) Prior Publication Data

US 2025/0068371 A1　　Feb. 27, 2025

Related U.S. Application Data

(63) Continuation of application No. PCT/JP2023/018248, filed on May 16, 2023.

(60) Provisional application No. 63/342,775, filed on May 17, 2022.

(30) Foreign Application Priority Data

Mar. 30, 2023　　(JP) ................................. 2023-056541

(51) Int. Cl.
　　*G06F 3/14* 　　(2006.01)
　　*G06T 3/40* 　　(2006.01)
　　*G06V 20/70* 　　(2022.01)

(52) U.S. Cl.
　　CPC .................. *G06F 3/14* (2013.01); *G06T 3/40* (2013.01); *G06V 20/70* (2022.01)

(58) Field of Classification Search
　　CPC ...... G06F 3/0481; G06F 3/04845; G06F 3/14; G06T 3/40; G06V 20/70
　　See application file for complete search history.

(56) References Cited

U.S. PATENT DOCUMENTS

2014/0270692 A1　　9/2014　Suzuki
2016/0051215 A1 *　2/2016　Chen ...................... A61B 6/463
　　　　　　　　　　　　　　　　　715/771
2017/0278037 A1　　9/2017　Pettersson et al.
(Continued)

FOREIGN PATENT DOCUMENTS

JP　　　2014-183380　　　9/2014
JP　　　2015-018013　　　1/2015
JP　　　2021-086224　　　6/2021

OTHER PUBLICATIONS

International Search Report issued in International Pat. Appl. No. PCT/JP2023/018248, dated Jun. 27, 2023, along with an English translation thereof.

*Primary Examiner* — Insa Sadio
(74) *Attorney, Agent, or Firm* — Greenblum & Bernstein, P.L.C.

(57)　　　　　ABSTRACT

An information processing device detects selection of an image by a user, determines whether an annotation region is set in the image, and in a case where determination is made that the annotation region has been set in the image, sets a first display range in the image so that the annotation region is located at a center of the image, and displays the image in the first display range on a display.

9 Claims, 8 Drawing Sheets

(56)          References Cited

U.S. PATENT DOCUMENTS

2020/0193559  A1*   6/2020   Sano ......................... G06F 3/14
2023/0169422  A1     6/2023   Sawada et al.

* cited by examiner

Figure 6:
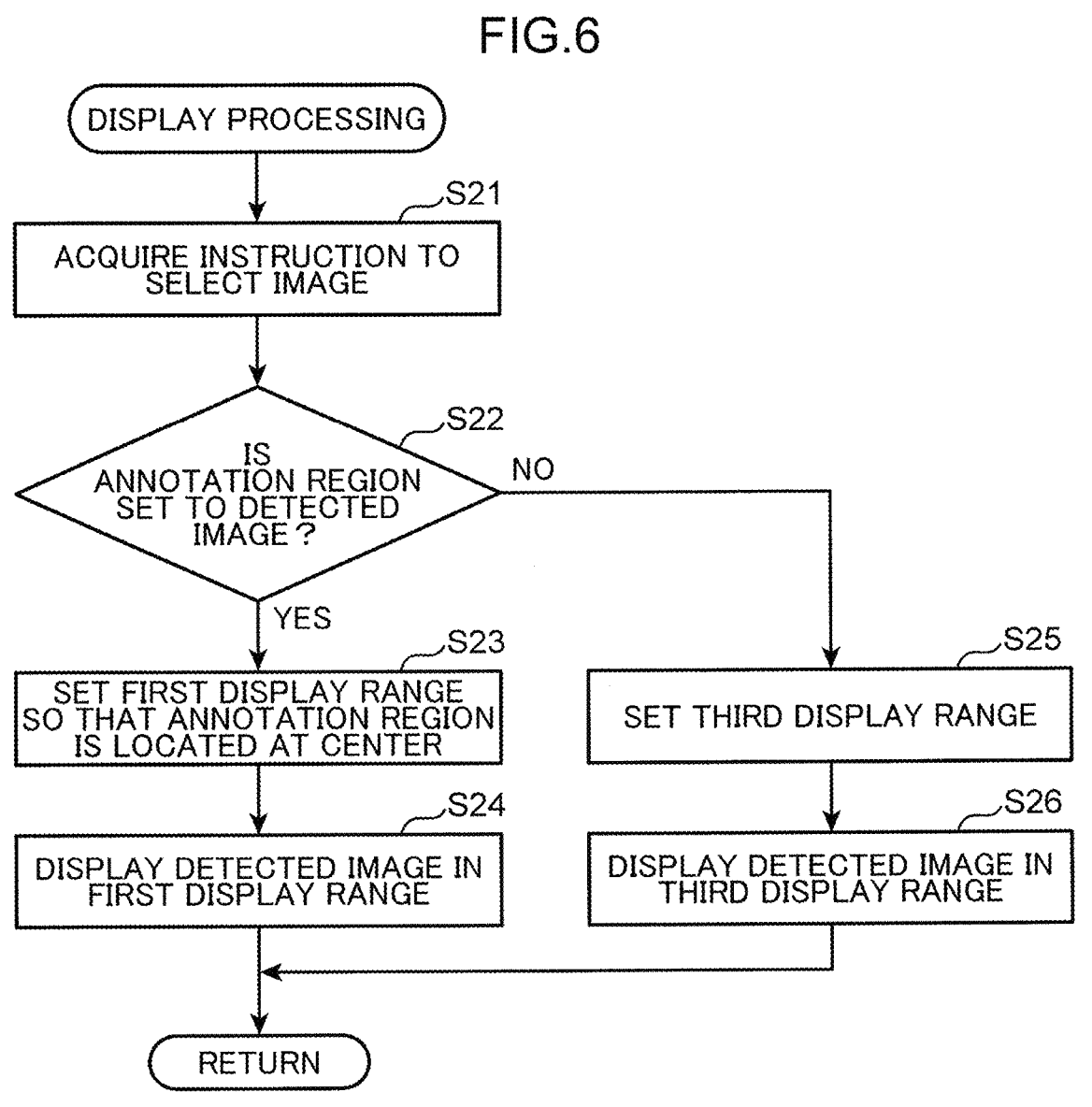

DISPLAY PROCESSING

S21

ACQUIRE INSTRUCTION TO
SELECT IMAGE

S22

IS
ANNOTATION REGION
SET TO DETECTED
IMAGE ?

NO

YES

S23

SET FIRST DISPLAY RANGE
SO THAT ANNOTATION REGION
IS LOCATED AT CENTER

S25

SET THIRD DISPLAY RANGE

S24

DISPLAY DETECTED IMAGE IN
FIRST DISPLAY RANGE

S26

DISPLAY DETECTED IMAGE IN
THIRD DISPLAY RANGE

RETURN

FIG.8

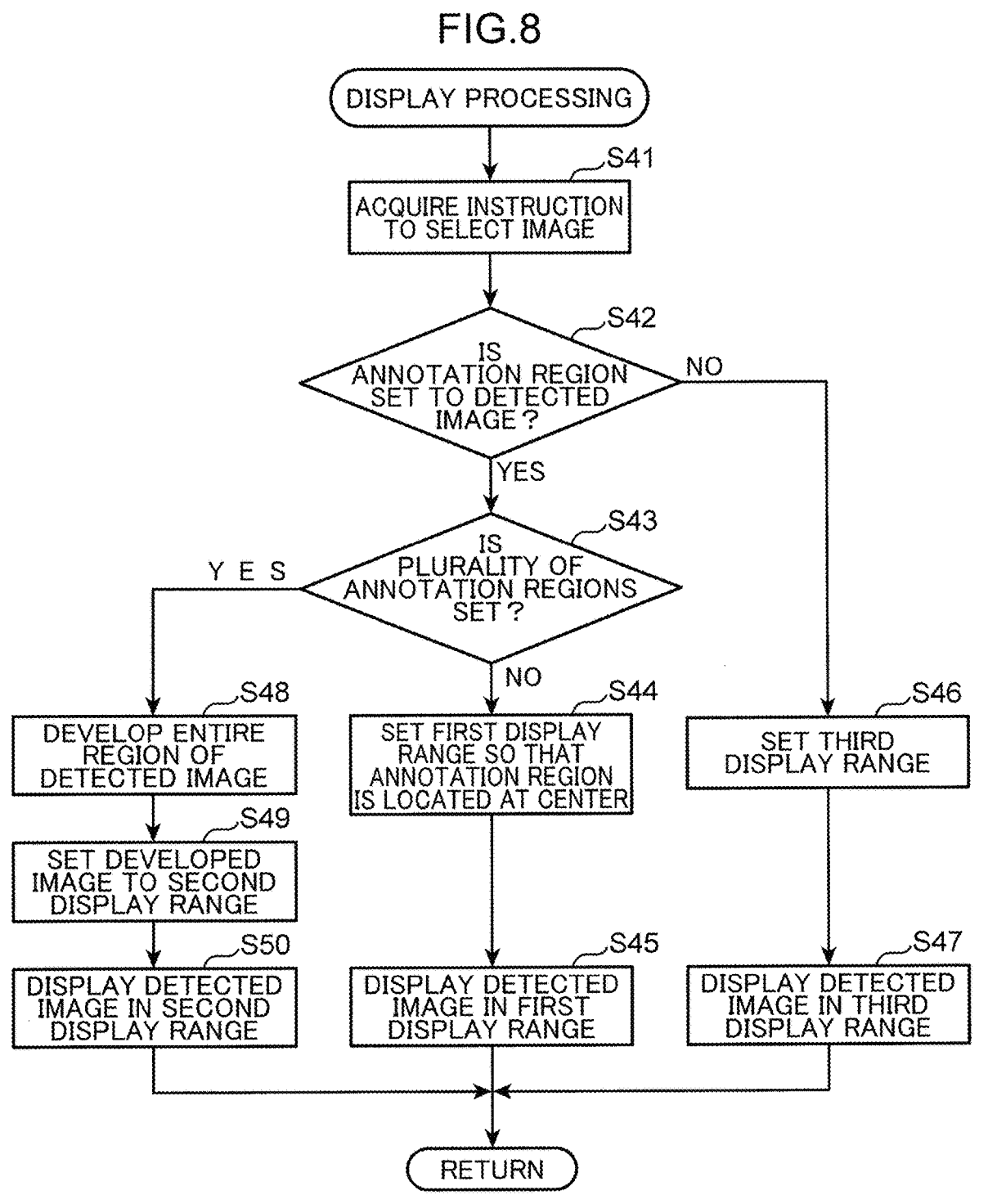

```
        ┌──────────────────────┐
        │  DISPLAY PROCESSING  │
        └──────────────────────┘
                   │
                   ▼              S41
        ┌──────────────────────┐
        │ ACQUIRE INSTRUCTION  │
        │   TO SELECT IMAGE    │
        └──────────────────────┘
                   │
                   ▼              S42
              IS
       ANNOTATION REGION ──────NO──────┐
        SET TO DETECTED               │
           IMAGE?                     │
                   │                  │
                  YES                 │
                   ▼           S43    │
              IS                      │
     YES──PLURALITY OF                │
         ANNOTATION REGIONS           │
              SET?                     │
          │        │                  │
          │        NO                 │
          ▼        ▼                  ▼
  S48           S44               S46
┌──────────┐ ┌──────────────┐ ┌──────────────┐
│ DEVELOP  │ │ SET FIRST    │ │  SET THIRD   │
│ ENTIRE   │ │ DISPLAY      │ │ DISPLAY      │
│ REGION   │ │ RANGE SO     │ │ RANGE        │
│ OF       │ │ THAT         │ └──────────────┘
│ DETECTED │ │ ANNOTATION   │        │
│ IMAGE    │ │ REGION IS    │        │
└──────────┘ │ LOCATED AT   │        │
     │       │ CENTER       │        │
     ▼ S49   └──────────────┘        │
┌──────────┐        │                │
│ SET      │        │                │
│ DEVELOPED│        │                │
│ IMAGE TO │        │                │
│ SECOND   │        │                │
│ DISPLAY  │        │                │
│ RANGE    │        │                │
└──────────┘        │                │
     │ S50          ▼ S45            ▼ S47
┌──────────┐ ┌──────────────┐ ┌──────────────┐
│ DISPLAY  │ │ DISPLAY      │ │ DISPLAY      │
│ DETECTED │ │ DETECTED     │ │ DETECTED     │
│ IMAGE IN │ │ IMAGE IN     │ │ IMAGE IN     │
│ SECOND   │ │ FIRST        │ │ THIRD        │
│ DISPLAY  │ │ DISPLAY      │ │ DISPLAY      │
│ RANGE    │ │ RANGE        │ │ RANGE        │
└──────────┘ └──────────────┘ └──────────────┘
     │             │                │
     └─────────────┼────────────────┘
                   ▼
            ┌─────────────┐
            │   RETURN    │
            └─────────────┘
```

INFORMATION PROCESSING METHOD, INFORMATION PROCESSING DEVICE, AND NON-TRANSITORY COMPUTER READABLE RECORDING MEDIUM

FIELD OF INVENTION

The present disclosure relates to a technique for displaying an image.

BACKGROUND ART

Patent Literature 1 discloses displaying an image (for example, a contour line) indicating a designated area designated by a worker on a bird's eye captured image of a work site, and displaying a chat related to the designated area input by the worker in a display field provided next to the bird's eye captured image.

However, Patent Literature 1 does not disclose, as the related art, displaying the image of a certain point of the bird's-eye captured image in a case where the user selects this certain point. Therefore, there is no disclosure that the user selects the image in which the annotation region has been set. Therefore, in Patent Literature 1, the user cannot quickly check the annotation region when selecting the image in which the annotation region has been set.

Patent Literature 1: JP 2021-86224 A

SUMMARY OF THE INVENTION

The present disclosure has been made to solve such a problem, and an object of the present disclosure is to provide a technique that enables a user to quickly check an annotation region in a case of selecting an image in which the annotation region has been set.

An information processing method according to one aspect of the present disclosure is an information processing method in a computer, the method including: detecting selection of an image by a user; determining whether an annotation region has been set in the image; in a case where determination is made that the annotation region has been set in the image, setting a first display range in the image so that the annotation region is located at a center of the image; and displaying the image in the first display range on a display.

According to this configuration, in a case of selecting the image in which the annotation region has been set, the user can quickly check the annotation region.

BRIEF DESCRIPTION OF THE DRAWINGS

FIG. 6 is a flowchart illustrating details of display processing illustrated in FIG. 5.

FIG. 8 is a flowchart illustrating details of display processing according to a second embodiment.

Figure 1:
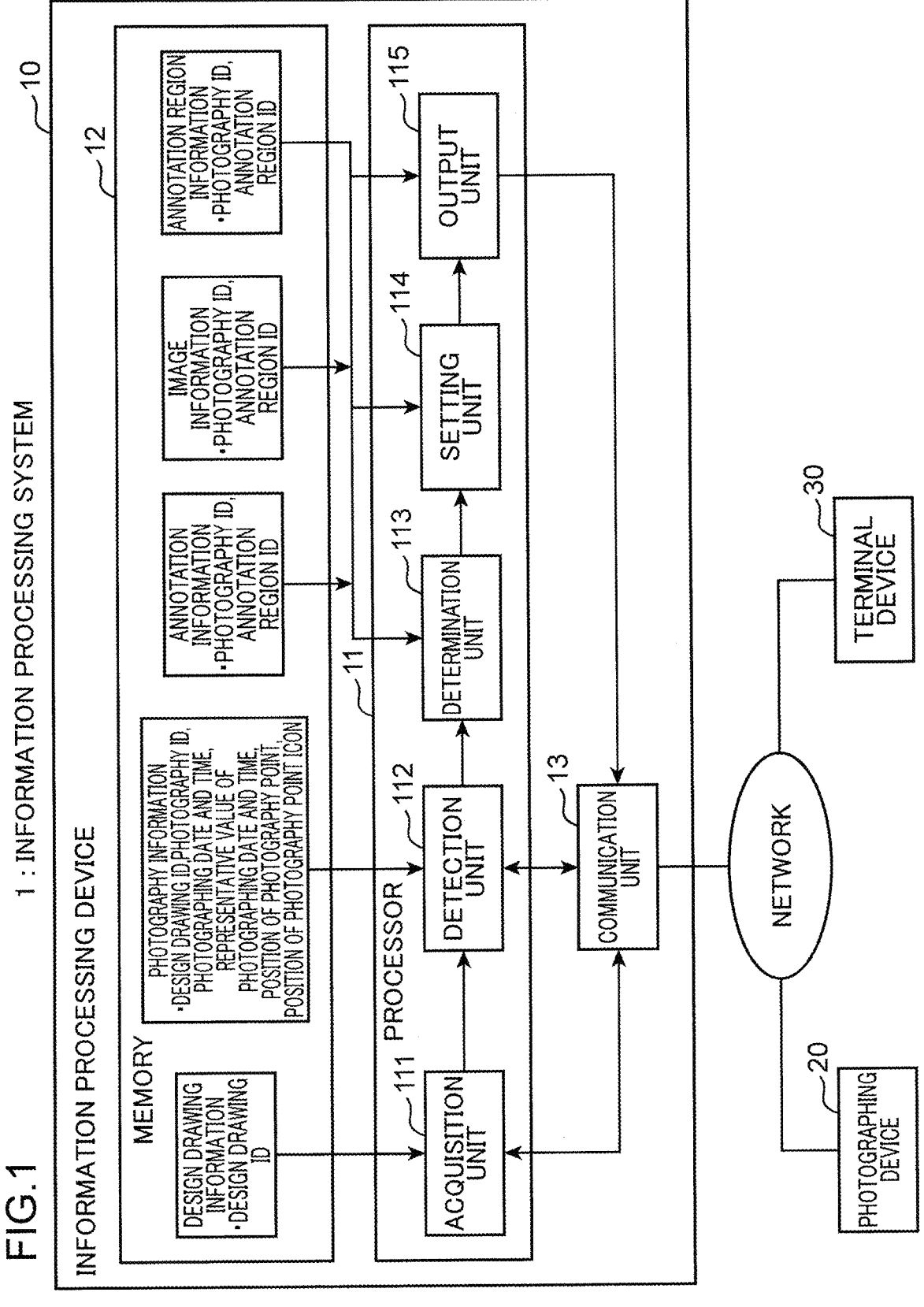
FIG. 1 is a block diagram illustrating one example of a configuration of an information processing system according to a first embodiment of the present disclosure.

DETAILED DESCRIPTION (How One Aspect of the Present Disclosure Has Come About)

Problems of a construction site include communication problems such as that a specific instruction does not come through workers and that it takes time to explain the instruction, and problems of checking the construction site such as that manpower is required to go around the entire construction site and it takes time to move to the construction site.

In order to solve such a problem, for example, it is conceivable that a large number of cameras are installed at the construction site, and a site supervisor who is remotely gives instructions to workers while referring to images obtained from the large number of cameras. However, in the construction site, the progress of the construction brings work such as removing installed sensors and installing the removed sensors in another places. Since such work takes time and effort, it is not practical to install the sensors at the construction site. Therefore, the inventor of the present invention has studied a technique capable of remotely checking the details of a situation of the construction site without installing sensors.

Then, it has been found that, when an operation for selecting a certain position is input on a design drawing of the construction site displayed on the display, if there is a user interface that displays an image of the construction site photographed in advance at the certain position and an annotation input by a worker to the image, the details of the situation of the construction site can be checked from a remote location.

Further, it is also assumed that such an annotation is input in association with an annotation region set in the image by the worker. In a case where an omnidirectional image is adopted as the image, it is difficult to see if the entire image is displayed on the display at a time. Therefore, a default display range set in advance from the entire image is generally displayed on the display. However, in a case where the default display range includes no annotation region, the worker needs to scroll the image displayed on the display to find the annotation region, which takes time and effort. Furthermore, since processing for scrolling the image is performed in accordance with the scrolling operation, processing load on the computer increases.

Therefore, the present inventor has found that when an instruction to select an image is input by the worker, the scrolling operation described above is made unnecessary by determining a display range of an image so that the range includes the annotation region, and displaying the image of the display range on the display, and thus the worker can quickly check the annotation region.

The present disclosure has been made based on such findings.

(1) An information processing method according to one aspect of the present disclosure is an information processing method in a computer, the method including: detecting selection of an image by a user; determining whether an annotation region has been set in the image; in a case where determination is made that the annotation region has been set in the image, setting a first display range in the image so that the annotation region is located at a center of the image; and displaying the image in the first display range on a display.

According to this configuration, in a case where the user selects the image in which the annotation region has been set, the first display range is set in the image so that the annotation region is located at the center, and the image in the first display range is initially displayed on the display. For this reason, the user can quickly check the annotation region set in the image without performing a scrolling operation for searching for an annotation region D1. Further, since the scrolling operation does not have to be input, a processing load required for scrolling processing, such as the scrolling operation and scrolling display, is reduced.

(2) The information processing method according to (1) may further include determining whether a plurality of the annotation regions has been set in the image, wherein in the case where the determination is made that the plurality of the annotation regions has been set in the image, in the setting, a second display range may be set in the image so that the second display range includes the plurality of the annotation regions, and in the displaying, the image in the second display range may be displayed on the display.

According to this configuration, in a case where the plurality of the annotation regions is set in the image, the user can simultaneously check the plurality of the annotation regions.

(3) In the information processing method according to (2), the image may be an omnidirectional image, and the image in the second display range may be a developed image obtained by developing an entire region of the omnidirectional image.

According to this configuration, since the developed image obtained by developing the entire region of the omnidirectional image is initially displayed on the display as the image in the second display range, a user can grasp relative positions of the plurality of the annotation regions with respect to the entire image without performing the scrolling operation.

(4) The information processing method according to (2) or (3) may further include displaying, on the display, in a case where an operation for selecting any one of the plurality of the annotation regions is detected in the image in the second display range displayed on the display, annotation information associated with the selected annotation region.

According to this configuration, the annotation information can be checked by inputting the operation for selecting an annotation region about which annotation information is desired to be checked from among the plurality of the annotation regions.

(5) In the information processing method according to any one of (1) to (4), in the case where the determination is made that the annotation region has been set in the image, in the setting, a predetermined third display range is set in the image, and in the displaying, the image in the third display range is displayed on the display.

According to this configuration, the image in the predetermined third display range is displayed on the display as for an image in which no annotation region is set.

(6) In the information processing method according to any one of (1) to (5), the first display range may include an entire region of the annotation region and a predetermined range around the annotation region.

According to this configuration, since an image around the annotation region is also displayed simultaneously with the image of the entire region of the annotation region, the user can grasp the relative position of the annotation region with respect to the entire image.

(7) In the information processing method according to any one of (1) to (6), in the setting, a magnification for displaying the image in the first display range in a predetermined size of a display area included in the display may be set.

According to this configuration, the image in the first display range can be displayed in accordance with the predetermined size.

(8) In the information processing method according to any one of (1) to (7), the image may be an image obtained by photographing a site.

According to this configuration, the user can check the image obtained by photographing the site such as a construction site.

(9) An information processing device according to another aspect of the present disclosure includes a processor, wherein the processor detects selection of an image by a user, determines whether an annotation region has been set in the image, in a case where determination is made that the annotation region has been set in the image, sets a first display range in the image so that the annotation region is located at a center of the image, and displays the image in the first display range on a display.

This configuration makes it possible to provide an information processing device with which a user can quickly check an annotation range set on an image.

(10) An information processing program according to still another aspect of the present disclosure causes a computer to perform the information processing method according to any one of (1) to (8).

This configuration makes it possible to provide an information processing program with which a user can quickly check an annotation range set on an image.

The present disclosure can also be implemented as an information processing system that is operated by such an information processing program. It is needless to say that such a computer program can be distributed via a computer-readable non-transitory recording medium such as a CD-ROM, or via a communication network such as the Internet.

Each of embodiments described below illustrates a specific example of the present disclosure. Numerical values, shapes, components, steps, order of steps, and the like shown in the embodiments below are merely one example, and are not intended to limit the present disclosure. Furthermore, a component that is not described in an independent claim representing the highest concept among components in the embodiments below is described as an arbitrary constituent. In all the embodiments, respective contents can be combined.

First Embodiment

FIG. 1 is a block diagram illustrating an example of a configuration of an information processing system 1 according to a first embodiment of the present disclosure. The information processing system 1 includes an information processing device 10, a photographing device 20, and a terminal device 30. The information processing device 10, the photographing device 20, and the terminal device 30 are communicably connected via a network. An example of the network is the Internet. The information processing device 10 includes, for example, a cloud server including one or a plurality of computers. However, this is an example, and the information processing device 10 may be configured by an edge server or may be mounted to the terminal device 30.

The photographing device 20 includes, for example, an omnidirectional camera, and photographs an image at a predetermined frame rate. The photographing device 20 is, for example, a portable photographing device carried by the user. The user is, for example, a worker and a site supervisor at a construction site. The user moves in the construction site while photographing the construction site with the photographing device 20. The photographing device 20 transmits image information indicating the photographed image to the information processing device 10 via the network. In the image information, a position of photography point indicating a photography point is associated with a photographing date and time. The position of the photography point is acquired by, for example, a position sensor such as a magnetic sensor or a global positioning system (GPS) sensor included in the photographing device 20, and is represented by latitude and longitude. The photographing date and time is acquired by, for example, a clock included in the photographing device 20. As a result, the information processing device 10 can acquire image information at a plurality of photography points in the construction site. Here, since the photographing device 20 photographs an image at a predetermined frame rate, the photography point is defined in units of frame periods. However, this is an example, and the photography point may be defined every predetermined time (for example, 1 second, 1 minute, etc.). The photographing device 20 includes an image sensor, an operation device, a communication circuit, a signal processing circuit, and the like. The photographing device 20 may be configured by a portable computer such as a smartphone or a tablet computer.

The terminal device 30 is carried by the user. The terminal device 30 may be configured by, for example, a portable computer, such as a smartphone or a tablet computer, or may be configured by a stationary computer. The terminal device 30 displays the image information on the display under control of the information processing device 10. Although one terminal device 30 is illustrated in the example of FIG. 1, a plurality of terminal devices may be connected to the information processing device 10 via the network. The terminal device 30 includes a central processing unit (CPU), a memory, a display, an operation device, such as a touch panel and a keyboard, and a communication circuit.

The information processing device 10 includes a processor 11, a memory 12, and a communication unit 13. The processor 11 includes, for example, a central processing unit (CPU). The processor 11 includes an acquisition unit 111, a detection unit 112, a determination unit 113, a setting unit 114, and an output unit 115. The acquisition unit 111 through the output unit 115 may be implemented by the processor 11 executing an information processing program, or may be configured by a dedicated hardware circuit such as an application-specific integrated circuit (ASIC).

The acquisition unit 111 acquires, from the terminal device 30, an instruction to select a design drawing from the user, reads design drawing information indicated by the instruction from the memory 12, and displays the read design drawing information on the display of the terminal device 30. The design drawing information is information indicating a design drawing of a construction site. The design drawing information is one example of a bird's-eye view. The acquisition unit 111 displays, on the terminal device 30, a plurality of photography point icons indicating photography points in the design drawing and a selection icon for selecting any positions in the design drawing. These displays are implemented by the acquisition unit 111 transmitting a display instruction to the terminal device 30 using the communication unit 13. The selection icon is configured to be movable on the design drawing. The acquisition unit 111 displays the photography point icons on positions associated with the photography points on the design drawing. In the design drawing, latitude and longitude are associated in advance with positions being key points. The positions serving as key points are, for example, positions of four corners in the design drawing.

The detection unit 112 detects selection of an image by the user. Specifically, the selection of an image is detected as follows. The detection unit 112 acquires, from the terminal device 30, a current position of a selection icon being moved on the design drawing by a user's operation. This current position is coordinates on the design drawing. The detection unit 112 detects a movement completion position of the selection icon. The selection icon is configured movably by a drag and drop operation. Hereinafter, the movement completion position is referred to as a dropping position. The detection unit 112 may detect, as the dropping position, the current position of the selection icon when operation information indicating the dropping operation is acquired from the terminal device 30 via the communication unit 13. The detection unit 112 determines one photography point icon based on the detected dropping position and the position of each photography point icon. Image information indicating an image photographed by the photographing device 20 is associated with each photography point icon in advance. Therefore, the user selects an image by moving the selection icon on the design drawing and performing an operation for selecting one photography point icon.

The plurality of photography point icons includes a first photography point icon associated with image information and annotation information. The annotation information indicates an annotation that is input using the terminal device 30 by the user who has viewed the image information. Using the terminal device 30, the user inputs an annotation region to the image indicated by the image information. The annotation is given to this annotation region. For example, the annotation is a message indicating a content to be noted during work for an object include in the annotation region. An annotation icon indicating that there is an annotation is displayed in association with the first photography point icon.

Details of the determination of one photography point icon are as follows. When the dropping position is positioned outside a predetermined region with respect to the position of each of the plurality of photography point icons, the detection unit 112 detects, as one photography point icon, the first photography point icon closest to the dropping position. When the dropping position is positioned within the predetermined region with respect to the position of a certain photography point icon, the detection unit 112 determines this photography point icon as one photography point icon.

The determination unit 113 determines whether an annotation region has been set in the image (hereinafter, referred to as a detected image) detected by the detection unit 112. When an annotation region ID is associated with the image information indicating the detected image, the determination unit 113 may determine that the annotation region has been set in the detected image. When no annotation region ID is associated with the image information indicating the detected image, the determination unit 113 may determine that no annotation region has been set in the detected image.

When the determination unit 113 determines that the annotation region has been set in the detected image, the setting unit 114 sets the first display range so that the annotation region is located at the center of the detected image. The center is, for example, the center of the first display screen. However, this is an example, and the center may be a constant region including the center of the first display screen. The first display range has, for example, a rectangular shape similar to a display area (image information display field R1 in FIG. 2) of the detected image provided on the display of the terminal device 30. The annotation region can be set to any shape by the user. The first display range is set to a size of about 1.2 to 1.5 times the circumscribed rectangle of the annotation region. As a result, the first display range includes the entire region of the annotation region and a surrounding image of the annotation region.

The setting unit 114 sets a magnification for displaying the detected image in the first display range in a predetermined size. The predetermined size is the size of the above-described display area (the image information display field R1 in FIG. 2). As a result, the detected image in the first display range is displayed in the entire region of the display area.

When the determination unit 113 determines that no annotation region has been set in the detected image, the setting unit 114 sets a predetermined third display range in the detected image.

The output unit 115 outputs a display instruction of the detected image in the first display range to the terminal device 30 via the communication unit 13, thereby displaying the detected image in the first display range on the display of the terminal device 30. The display instruction of the detected image in which the annotation region has been set includes the image information about the detected image, the position (coordinates) of the first display range, the magnification of the first display range, and the annotation information associated with the annotation region set in the detected image. The display instruction of the detected image in which no annotation region has been set includes image information about the detected image, the position (coordinates) of the third display range, and the magnification of the third display range but no annotation information.

The memory 12 includes a nonvolatile rewritable storage device such as a solid state drive and a hard disk drive. The memory 12 stores design drawing information, photography information, annotation information, image information, and annotation region information. The design drawing information is image information indicating a design drawing. The design drawing information is associated with a design drawing ID for identifying the design drawing. In the design drawing, latitude and longitude of an actual construction site are set as a key point as described above.

The photography information indicates information regarding one photographing operation using the photographing device 20. The photography information is generated every time one photographing operation is performed. One photographing operation refers to a series of operations from the start to the end of photographing at the construction site by a worker carrying the photographing device 20. A plurality of images is photographed by one photographing operation. The photography information includes a design drawing ID, a photography ID, a photographing date and time, a representative value of photographing date and time, a position of photography point, and a position of photography point icon. The design drawing ID is an identifier of a design drawing of the construction site that is photographed. The photography ID is an identifier for identifying each photography included in one photographing operation. The photographing date and time is photographing date and time of the photography indicated by the photography ID. The representative value of photographing date and time is photographing date and time at the start of photography. The photography point indicates a position (latitude and longitude) at which photography indicated by the photography ID is performed. The position of photography point icon indicates a display position (coordinates) on the design drawing of the photography point icon associated with the photography ID. The position of photography point icon is calculated by mapping the photography position onto the design drawing based on the photography position (latitude and longitude) at the key point of the design drawing indicated by the design drawing information and the photography point (latitude and longitude) associated with the photography ID.

The annotation information is information indicating an annotation. One piece of annotation information corresponds to one annotation. The annotation information is associated with a photography ID and an annotation region ID. The annotation region ID is an identifier of the annotation region set in the image associated with a photography ID.

The image information indicates one image photographed by each photography included in one image photographing operation. The image information is associated with a photography ID and an annotation region ID. When a plurality of annotation regions is set in the image information associated with the photography ID, the image information includes a plurality of annotation region IDs.

The annotation region information stores the position (coordinates) of the key point of the annotation region set in the image information associated with the photography ID. The key point is a vertex on the contour of the annotation region. The annotation region information is associated with a photography ID and an annotation region ID.

In this manner, since the photography information and the image information are associated with the photography ID, the image information associated with the photography point icon is designated using the photography ID as a key. Since the annotation information and the annotation region information are associated with the annotation region ID, the annotation information associated with the annotation region is designated using the annotation region ID as a key. Since the annotation region information and the image information are associated with the photography ID, the image information associated with the annotation region is designated using the photography ID as a key. The photography point icon associated with the photography ID associated with the annotation information is the first photography point icon.

The communication unit 13 includes a communication circuit that connects the information processing device 10 to the network.

Figure 2:
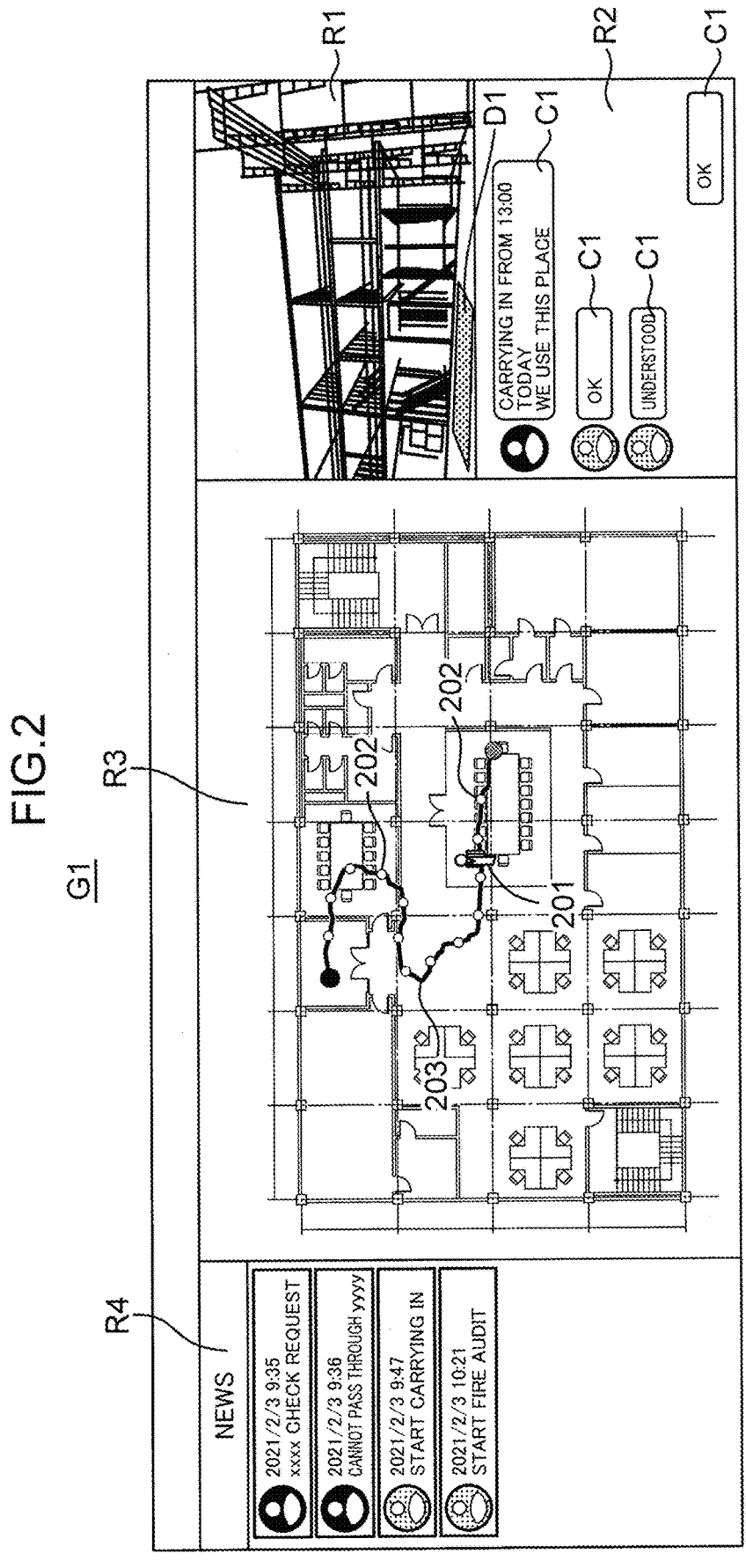
FIG. 2 is a diagram illustrating an example of a display screen displayed on a display of a terminal device.

FIG. 2 is a view illustrating an example of a display screen G1 displayed on the display of the terminal device 30. The display screen G1 is a basic screen of an application provided by the information processing device 10. The display screen G1 includes an image information display field R1, an annotation information display field R2, a design drawing display field R3, and a news display field R4.

The image information display field R1 displays image information associated with one photography point icon determined by the detection unit 112.

The annotation information display field R2 displays annotation information associated with the determined one photography point icon. Here, annotations C1 input by a plurality of users for the image information displayed in the image information display field R1 are displayed in a list form. In the annotation information display field R2, the annotations C1 input by users other than the user himself/ herself are displayed on the left side, and the annotation C1 input by the user himself/herself is displayed on the right side.

In the default display screen G1 immediately after the start of the application, no photography point icon is selected by the user. Therefore, in the default display screen G1, the image information display field R1 and the annotation information display field R2 are blank.

The design drawing display field R3 displays a design drawing of the construction site. In the design drawing displayed in the design drawing display field R3, a selection icon 201, a photography point icon 202, and a trajectory 203 are displayed in a superimposed manner.

The selection icon 201 is configured movably by a drag and drop operation. In this example, the selection icon 201 includes an image simulating a human.

The photography point icon 202 is an icon indicating a photography point, and is associated with image information. In this example, the photography point icon 202 includes a circular image. The trajectory 203 indicates a trajectory of the user who has photographed the image information. In this example, the trajectory 203 includes a line connecting the adjacent photography point icons 202. The photography point icon 202 positioned at the leading end of the trajectory 203 and the photography point icon 202 positioned at the trailing end of the trajectory 203 are displayed in a larger size than that of the other photography point icons. The photography point icon 202 positioned at the leading end (e.g., the right end) of the trajectory 203 indicates a photography start position, and the photography point icon 202 positioned at the trailing end (e.g., the left end) of the trajectory 203 indicates a photography end position.

The news display field R4 displays various messages related to this construction site, the messages being input by the user.

For example, when the selection icon 201 is dropped in a predetermined region of any of the photography point icons 202, this photography point icon 202 is decided as one photography point icon, and an image associated with the one photography point icon is detected as a detected image. The detected image is displayed in the image information display field R1. In this case, if the one photography point icon is the first photography point icon, the annotation information associated with the first photography point icon is displayed in the annotation information display field R2.

For example, it is assumed that the selection icon 201 is not dropped in the predetermined region in any of the photography point icons 202. In this case, the first photography point icon having the shortest distance with respect to the dropping position is decided as one photography point icon, and the image associated with the one photography point icon is detected as the detected image. The detected image is displayed in the image information display field R1, and the annotation information associated with the detected image is displayed in the annotation information display field R2.

Figure 3:
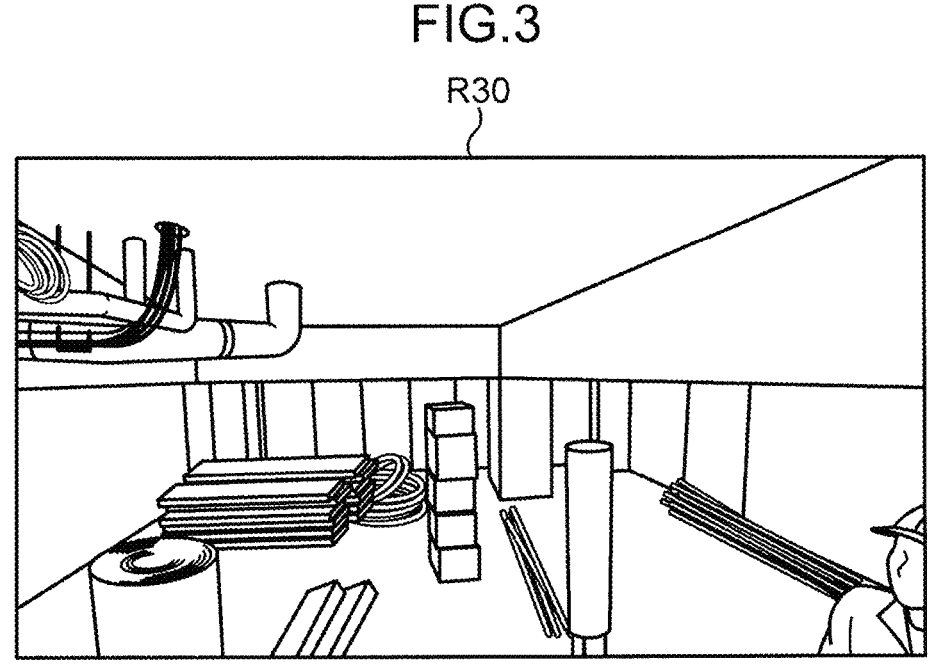
FIG. 3 is a diagram illustrating a third display range.

FIG. 3 is a diagram illustrating a third display range R30. Since no annotation region has been set in the detected image in the third display range R30, the annotation region is not displayed in the detected image in the third display range R30. The detected image in third display range R30 is a rectangular image in a predetermined range centered on the front direction of photographing device 20. Therefore, the detected image in the third display range R30 depends on the orientation of the photographing device 20 at the time of photographing. Therefore, when the detected image in which the annotation region D1 has been set is displayed in the third display range R30, the annotation region D1 may not be initially displayed. When acquiring an operation instruction to scroll the detected image in the third display range R30 from the terminal device 30, the output unit 115 transmits, to the terminal device 30, a display instruction to scroll and display the detected image displayed in the third display range R30 in accordance with the operation amount and the operation direction of the scrolling. As a result, the user enables display of a desired region of the detected image in the third display range R30.

Figure 4:
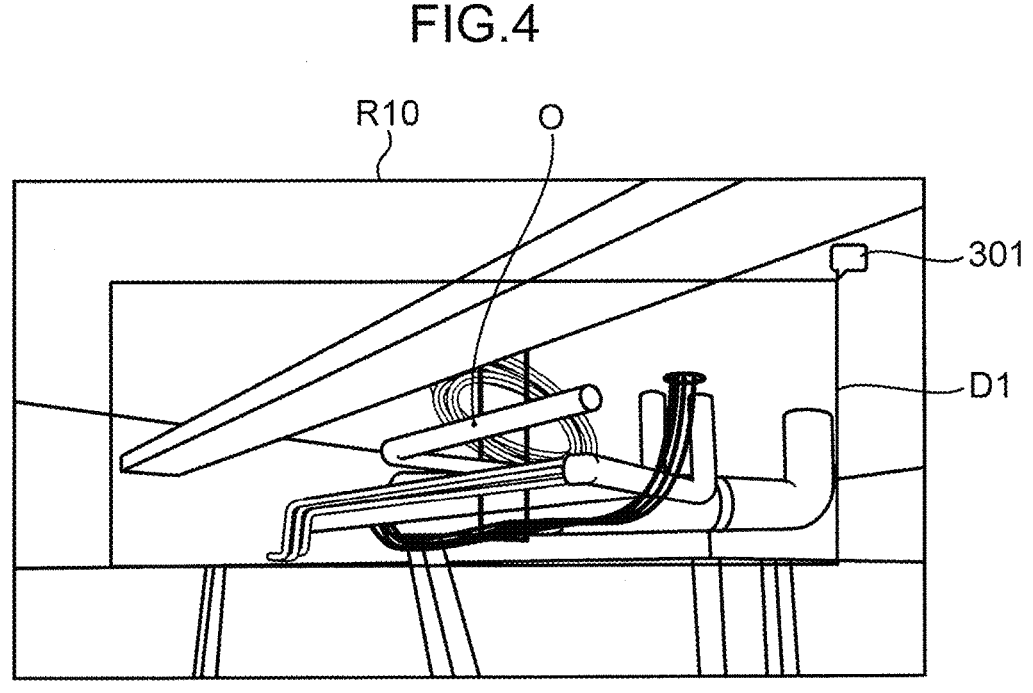
FIG. 4 is a diagram illustrating a first display range.

FIG. 4 is a diagram illustrating a first display range R10. Since the annotation region D1 has been set in the detected image, the annotation region D1 is displayed in the detected image in the first display range R10. In this example, the annotation region D1 is displayed using a frame body of a predetermined color (for example, red). An annotation icon 301 is displayed in association with the annotation region D1. The annotation icon 301 indicates that an annotation has been input to the annotation region. Here, a balloon mark is adopted as the annotation icon 301. The content of the annotation is not displayed in the annotation icon 301. Note that when acquiring an operation instruction to scroll the detected image in the first display range R10 from the terminal device 30, the output unit 115 transmits, to the terminal device 30, a display instruction to scroll and display the detected image displayed in the first display range R10 in accordance with the operation amount and the operation direction of the scrolling. As a result, the user enables display of a desired region of the detected image in the first display range R10.

In the detected image in the first display range R10, the entire region of the annotation region D1 is displayed. The detected image in the first display range R10 also includes a surrounding image of the annotation region D1 in addition to the detected image in the annotation region D1. As a result, the user can grasp a relative position of the annotation region D1 with respect to the entire region of the detected image. The center O of the detected image in the first display range R10 is set at the center of the annotation region D1. As a result, the annotation region D1 is displayed at the center of the detected image in the first display range R10. In this example, the first display range R10 includes the entire region of the annotation region D1, but may include a part of the annotation region D1.

Figure 5:
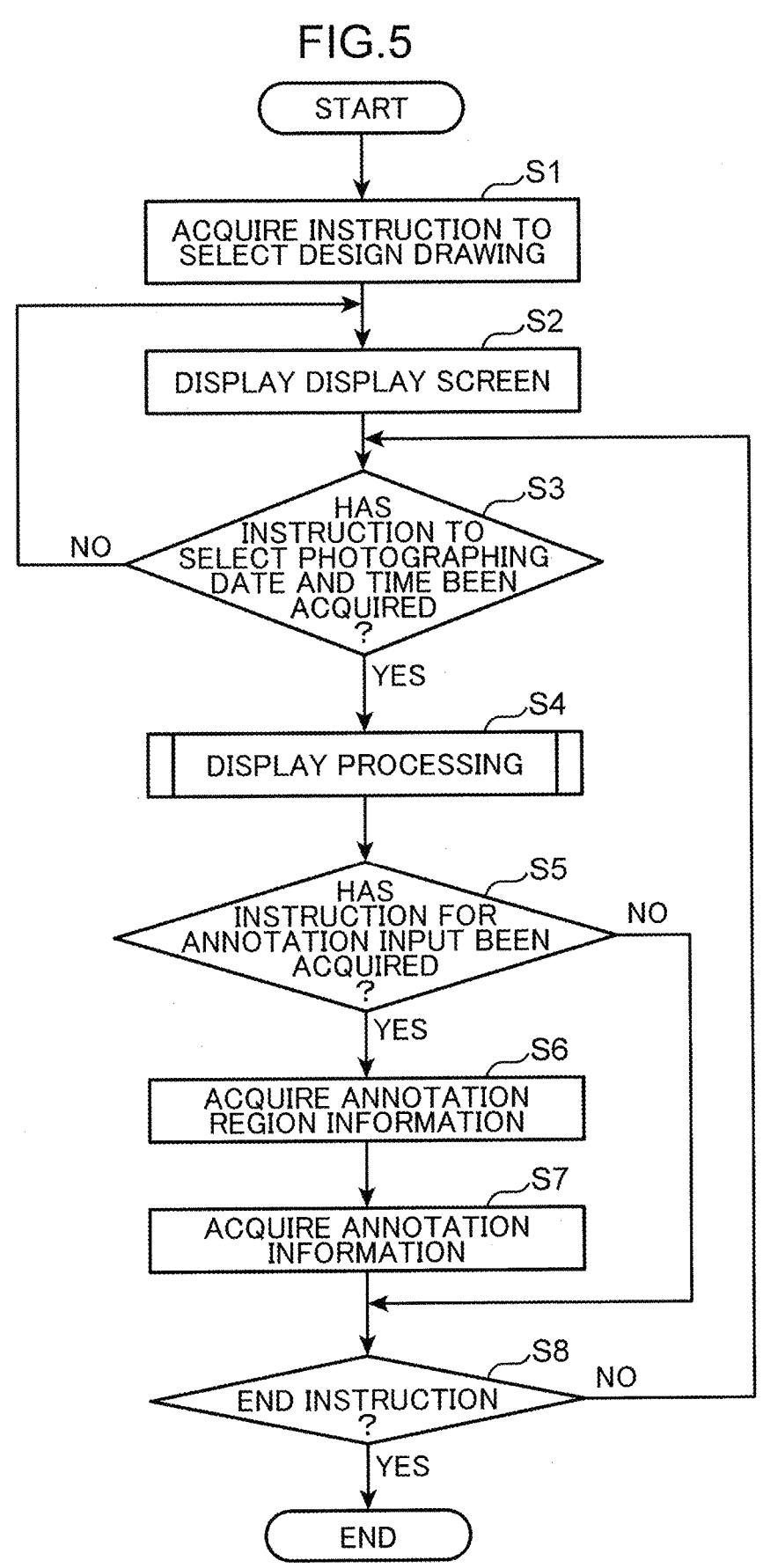
FIG. 5 is a flowchart illustrating an example of processing of an information processing device illustrated in FIG. 1.

FIG. 5 is a flowchart illustrating an example of the processing of the information processing device 10 illustrated in FIG. 1. The acquisition unit 111 acquires an instruction from a user who selects a design drawing (step S1). In this case, a menu screen for selecting a design drawing is displayed on the display of the terminal device 30, and an instruction to select one design drawing from the menu screen is input. The instruction that is input is transmitted to the information processing device 10 via the network and received by the communication unit 13. The acquisition unit 111 acquires the instruction via the communication unit 13. Since this instruction includes the design drawing ID, the acquisition unit 111 can acquire design drawing information indicating the instructed design drawing from among the design drawing information stored in the memory 12.

Next, the acquisition unit 111 displays the display screen G1 on the display of the terminal device 30 by transmitting a display instruction of the display screen G1 to the terminal device 30 via the communication unit 13 (step S2). The display instruction of the display screen G1 displayed by default includes the design drawing information indicating the design drawing selected in step S1 and the photography information associated with the latest photographing date and time. Therefore, as illustrated in FIG. 2, the display screen G1 displayed by default includes the selection icon 201 in the design drawing, and the photography point icon 202 and the trajectory 203 associated with the latest photographing date and time. At this time point, since one photography point icon has not been decided, the image information display field R1 and the annotation information display field R2 are blank. Note that, when an instruction to select the photographing date and time is input in step S3 described later, the acquisition unit 111 displays, on the display, the display screen G1 including the design drawing on which the photography point icon 202 and the trajectory 203 associated with the selected photographing date and time are displayed in a superimposed manner.

Next, the acquisition unit 111 determines whether to have acquired an instruction to select the photographing date and time from the user (step S3). In this case, the display of the terminal device 30 shows a menu screen for selecting photographing date and time. The user inputs an instruction to select one photographing date and time from the menu screen. The photographing date and time displayed on the menu screen is a representative value of the photographing date and time included in the photography information stored in the memory 12. When the photographing date and time is selected, one photographing operation associated with this photographing date and time is selected. The instruction that is input is transmitted to the information processing device 10 via the network and received by the communication unit 13. The acquisition unit 111 acquires the instruction via the communication unit 13. Since this instruction includes the representative value of the photographing date and time, the acquisition unit 111 can designate one piece of photography information stored in the memory 12. When the instruction to select the photographing date and time is input (YES in step S3), the processing proceeds to step S4. When the instruction to select the photographing date and time is not input (NO in step S3), the processing returns to step S2.

Next, display processing is executed (step S4). Details of the display processing will be described later with reference to FIG. 6. The display processing is processing for deciding one photography point icon by dragging and dropping the selection icon 201 on the design drawing and displaying an image associated with the decided one photography point icon in the image information display field R1.

Next, the acquisition unit 111 determines whether to have acquired an instruction for annotation input (step S5). The instruction for annotation input is an instruction that is input when the user intends to input an annotation to the image displayed in the image information display field R1. This instruction is input by performing an operation for selecting an annotation input instruction button (not illustrated) displayed on the display screen G1, for example. The instruction that is input is transmitted to the information processing device 10 via the network and received by the communication unit 13. The acquisition unit 111 acquires the instruction via the communication unit 13.

Next, when the instruction for annotation input has been acquired (YES in step S5), the acquisition unit 111 acquires annotation region information (step S6). The annotation region information is input by performing an operation for moving and deforming a frame body (not illustrated) as described above in the image information display field R1. The annotation region information that is input is transmitted to the information processing device 10 via the network and received by the communication unit 13. The acquisition unit 111 acquires the annotation region information via the communication unit 13. The acquisition unit 111 assigns the annotation region ID to the acquired annotation region information, and stores, in the memory 12, the annotation region information in association with the photography ID. As a result, the annotation region D1 is set as illustrated in FIG. 3.

Next, when the instruction for annotation input has not been acquired (NO in step S5), the processing proceeds to step S8.

Next, the acquisition unit 111 acquires annotation information (step S7). As illustrated in FIG. 2, the annotation information is input by inputting the annotation C1 to the annotation information display field R2 and pressing a transmission button not illustrated. The annotation information that is input is transmitted to the information processing device 10 via the network and received by the communication unit 13. The acquisition unit 111 acquires the annotation information via the communication unit 13. The acquisition unit 111 stores, in the memory 12, the acquired annotation information in association with the photography ID and the annotation region ID.

Next, the acquisition unit 111 determines whether to have acquired an end instruction (step S8). The end instruction is an instruction to close the display screen G1 displayed in step S3. This instruction is input by performing an operation for pressing an end button (not illustrated) displayed on the display screen G1. When the end instruction is acquired (YES in step S8), the processing ends. When the end instruction is not acquired (NO in step S8), the processing returns to step S3. In this case, the display of the display screen G1 is maintained. The end instruction is transmitted to the information processing device 10 via the network and received by the communication unit 13. The acquisition unit 111 acquires the end instruction via the communication unit 13.

FIG. 6 is a flowchart illustrating details of the display processing illustrated in FIG. 5. The detection unit 112 acquires an instruction to select an image (step S21). This instruction is conducted by performing the operation for dragging and dropping the selection icon 201 on the design drawing as illustrated in FIG. 2. As described above, the detection unit 112 determines one photography point icon selected by the user based on the dropping position and the position of the photography point icon 202, and detects an image associated with the one photography point icon as the image selected by the user. This image is a detected image.

Next, the determination unit 113 determines whether the annotation region D1 has been set in the detected image (step S22). This determination is made based on whether the annotation region ID is associated with the image information indicating the detected image.

When the annotation region D1 is set in the detected image (YES in step S22), the setting unit 114 sets the first display range R10 so that the annotation region D1 is located at the center of the detected image (step S23). In this case, as illustrated in FIG. 4, a region including the annotation region D1 and the surrounding image is set as the first display range R10.

The output unit 115 then transmits a display instruction of the detected image in the first display range R10 to the terminal device 30 via the communication unit 13, thereby displaying the detected image in the first display range R10 on the display of the terminal device 30 (step S24). As a result, the detected image in the first display range R10 is displayed in the image information display field R1. When step S24 ends, the processing proceeds to step S5 of FIG. 5.

When no annotation region is set in the detected image (NO in step S22), the setting unit 114 sets the third display range R30 in the detected image (step S25). In this case, as illustrated in FIG. 3, a region of a predetermined range centered on the front direction of the photographing device 20 during photographing is set as the third display range R30.

The output unit 115 then transmits a display instruction of the detected image in the third display range R30 to the terminal device 30 via the communication unit 13, thereby displaying the detected image in the third display range R30 on the display of the terminal device 30 (step S26). As a result, the detected image in the third display range R30 is displayed in the image information display field R1. When step S26 ends, the processing proceeds to step S5 of FIG. 5.

According to the first embodiment, in a case where the user selects the image in which the annotation region D1 has been set, the first display range R10 is set in the selected image so that the annotation region D1 is located at the center, and the detected image in the first display range R10 is initially displayed on the display of the terminal device 30. For this reason, the user can quickly check the annotation region D1 set in the image without performing the scrolling operation for searching for the annotation region D1.

Second Embodiment

In a second embodiment, when a plurality of annotation regions is set in a detected image, the detected image in a second display range indicating the entire region of the detected image is initially displayed. In the second embodiment, an overall configuration diagram of the information processing system 1 is the same as that in FIG. 1. Further, the processing of the information processing device 10 is the same as that in FIG. 5.

Figure 7:
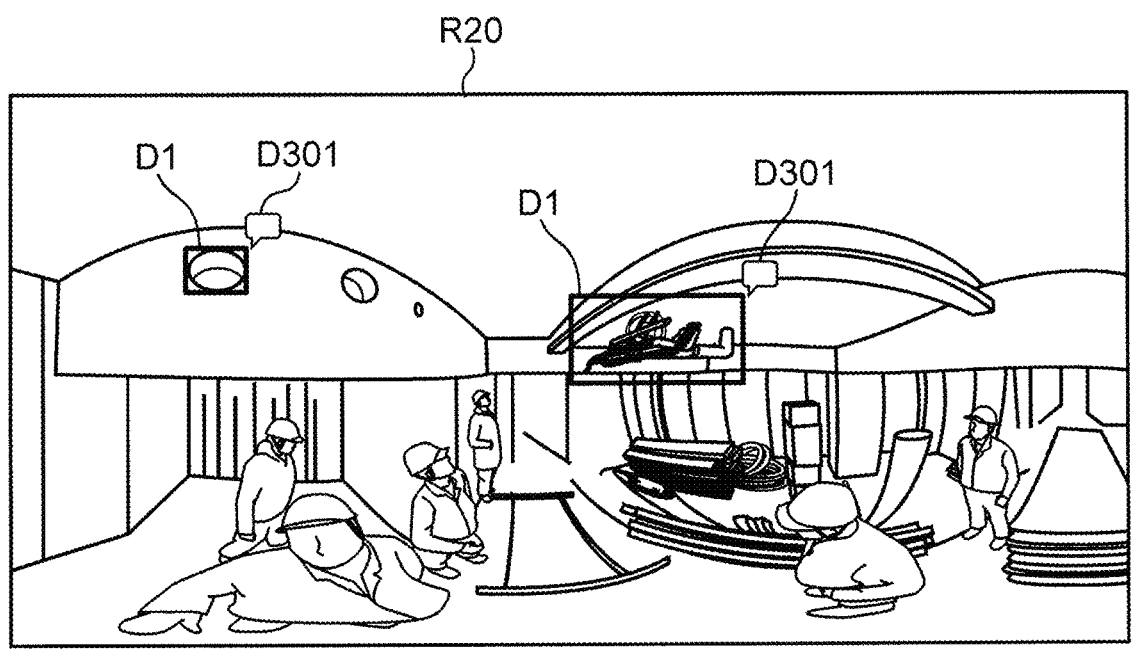
FIG. 7 is a diagram illustrating a second display range.

FIG. 7 is a diagram illustrating a second display range R20. The detected image in second display range R20 is a developed image obtained by developing the entire region of the detected image of a development source. Since the detected image of the development source is an omnidirectional image, the detected image in the second display range R20 is distorted. Two annotation regions D1 are set in the detected image of the development source. Therefore, two frame bodies respectively indicating the two annotation regions D1 are displayed on the detected image in the second display range R20 in a superimposed manner. Further, an annotation icon D301 is displayed in association with each of the two annotation regions D1. As a result, the user can simultaneously check the two annotation regions D1, and can grasp relative positions of the annotation regions D1 with respect to the entire region of the detected image.

For example, it is assumed that an instruction to select the left annotation region D1 is input by a user. In this case, on the display of the terminal device 30, annotation information associated with the left annotation region D1 is displayed in the annotation information display field R2. This also applies to a case where the right annotation region D1 is selected.

In the example of FIG. 7, the two annotation regions D1 are displayed. However, in a case where three or more annotation regions D1 are set in the detected image of the development source, the three or more annotation regions D1 are displayed in the detected image in the second display range R20.

FIG. 8 is a flowchart illustrating details of display processing according to the second embodiment. This display processing is a subroutine in step S4 of FIG. 5.

Steps S41, S42, S46, and S47 are the same as steps S21, S22, S25, and S26 in FIG. 6, and thus description thereof is omitted.

In step S43, the determination unit 113 determines whether the plurality of annotation regions D1 has been set in the detected image. In this case, when a plurality of annotation region IDs is associated with the image information indicating the detected image, the determination unit 113 determines that the plurality of annotation regions D1 has been set in the detected image.

When the plurality of annotation regions D1 has been set in the detected image (YES in step S43), the setting unit 114 develops the entire region of the detected image to generate a developed image (step S48). For example, the setting unit 114 generates a developed image of the detected image using equidistant projection, fisheye projection, or the like.

Next, the setting unit 114 sets the entire region of the developed image to the second display range R20 (step S49).

The output unit 115 then transmits a display instruction of the detected image in the second display range R20 set in step S49 to the terminal device 30 via the communication unit 13, thereby displaying the detected image in the second display range R20 on the display of the terminal device 30 (step S50). As a result, the detected image in the second display range R20 illustrated in FIG. 7 is displayed in the image information display field R1 (FIG. 2).

When one annotation region is set in the detected image (NO in step S43), the processing proceeds to step S44. Steps S44 and S45 are the same as steps S23 and S24 in FIG. 6, and thus description thereof is omitted.

As described above, according to the second embodiment, when the plurality of annotation regions is set in the detected image, the plurality of annotation regions D1 is displayed in the detected image in the second display range R20. Thus, the user can simultaneously check the plurality of annotation regions D1. Further, since the developed image obtained by developing the entire region of the omnidirectional image is set as the second display range R20 and the detected image in the second display range R20 is initially displayed on the display, the user can grasp the relative positions of the plurality of the annotation regions D1 with respect to the entire image.

Modifications described below can be adopted for the present disclosure.

(1) In the example of FIG. 7, the developed image obtained by developing the entire region of the detected image is displayed, but a part of the developed image may be displayed. In this case, the setting unit 114 may obtain a plurality of the centers of gravity of the plurality of annotation regions D1 in the developed image, and may set the second display range R20 centered on the centers of gravity. In this case, the setting unit 114 may set the second display range R20 so that the entire regions of the plurality of annotation regions D1 are included. As a result, it is possible to display the detected image in which the plurality of annotation regions D1 is displayed larger than the case of displaying the entire region of the developed image.

(2) In the above embodiments, one photography point icon is decided by dragging and dropping the selection icon 201, but this is an example, and one photography point icon may be decided by an operation for positioning and clicking a mouse pointer at a desired position.

(3) In the above embodiments, the construction site is exemplified as a site, but the present disclosure is not limited to this, and a manufacturing site, a distribution site, a logistics site, an agricultural land, a civil engineering site, a retail site, an office, a hospital, a commercial facility, a nursing care facility, or the like may be employed as the site.

(4) In the above embodiments, the detected image is an image photographed by the camera, but the present disclosure is not limited to this. For example, the detected image may be an image generated by rendering a three-dimensional model of a predetermined space. The three-dimensional model may be a model generated based on three-dimensional measurement data or a model generated based on building information modeling (BIM) data.

Figure 9:
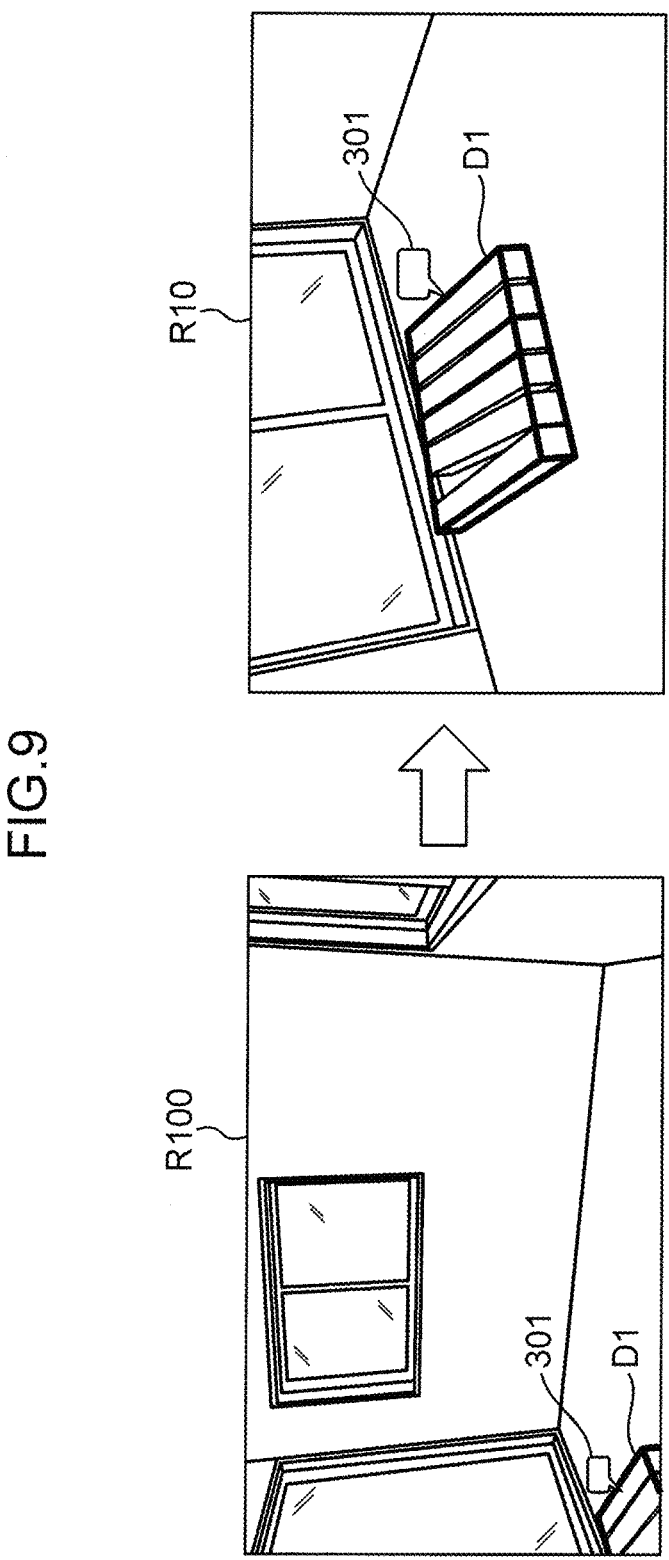
FIG. 9 is a diagram illustrating a first display range in a modification of the present disclosure.

FIG. 9 is a diagram illustrating a first display range R10 in a modification of the present disclosure. In FIG. 9, the left side illustrates a first display range R100 in a comparative example to which the display method of the present disclosure is not applied, and the right side illustrates the first display range R10 to which the display method of the present disclosure is applied. In this example, the images displayed in the first display ranges R10 and R100 are images obtained by rendering a three-dimensional model. In the present disclosure, not only the image photographed by the camera but also the image obtained by photographing a three-dimensional model by a virtual camera can be displayed so that an annotation region is displayed at the center of the first display range R10. Note that, in this example, the annotation region D1 is indicated by a contour line of an object instead of a frame body surrounding the object. Further, the annotation icon 301 is displayed in association with the annotation region D1.

In the first display range R100, since the detected image is not displayed so that the annotation region D1 is located at the center, only a part of the annotation region D1 is displayed, and the entire annotation region D1 is not displayed. On the other hand, in the first display range R10, the detected image is initially displayed so that the annotation region D1 is located at the center. Therefore, the user can check the annotation region D1 without performing the scrolling operation in order to display the entire annotation region D1 or search for the annotation region D1.

The present disclosure is useful for managing a construction site because the situation of the construction site can be checked remotely.

The invention claimed is:

1. An information processing method in a computer, the method comprising:

detecting selection of an image by a user;

determining whether an annotation region has been set in the image;

in a case where determination is made that the annotation region has been set in the image, setting a first display range in the image so that the annotation region is located at a center of the image;

displaying the image in the first display range on a display; and determining whether a plurality of the annotation regions has been set in the image, wherein in the case where the determination is made that the plurality of the annotation regions has been set in the image, in the setting, a second display range is set in the image so that the second display range includes the plurality of the annotation regions, and in the displaying, the image in the second display range is displayed on the display.

2. The information processing method according to claim 1, wherein the image is an omnidirectional image, and the image in the second display range is a developed image obtained by developing an entire region of the omnidirectional image.

3. The information processing method according to claim 1, further comprising displaying, on the display, in a case where an operation for selecting any one of the plurality of the annotation regions is detected in the image in the second display range displayed on the display, annotation information associated with the selected annotation region.

4. The information processing method according to claim 1, wherein the first display range includes an entire region of the annotation region and a predetermined range around the annotation region.

5. The information processing method according to claim 1, wherein in the setting, a magnification for displaying the image in the first display range in a predetermined size of a display area included in the display is set.

6. The information processing method according to claim 1, wherein the image is an image obtained by photographing a site.

7. An information processing method in a computer, the method comprising:

detecting selection of an image by a user;

determining whether an annotation region has been set in the image;

in a case where determination is made that the annotation region has been set in the image, setting a first display range in the image so that the annotation region is located at a center of the image; and displaying the image in the first display range on a display, wherein in the case where the determination is made that the annotation region has been set in the image, in the setting, a predetermined third display range is set in the image, and in the displaying, the image in the third display range is displayed on the display.

8. An information processing device, comprising a processor, wherein processor detects selection of an image by a user;

determines whether an annotation region has been set in the image;

in a case where determination is made that the annotation region has been set in the image, sets a first display range in the image so that the annotation region is located at a center of the image;

displays the image in the first display range on a display; and determines whether a plurality of the annotation regions has been set in the image, wherein in the case where the determination is made that the plurality of the annotation regions has been set in the image, in the setting, a second display range is set in the image so that the second display range includes the plurality of the annotation regions, and in the displaying, the image in the second display range is displayed on the display.

9. A non-transitory computer readable recording medium storing an information processing program causing a computer to execute a process of:

detecting selection of an image by a user;

determining whether an annotation region has been set in the image;

in a case where determination is made that the annotation region has been set in the image, setting a first display range in the image so that the annotation region is located at a center of the image;

displaying the image in the first display range on a display; and determining whether a plurality of the annotation regions has been set in the image, wherein in the case where the determination is made that the plurality of the annotation regions has been set in the image, in the setting, a second display range is set in the image so that the second display range includes the plurality of the annotation regions, and in the displaying, the image in the second display range is displayed on the display.

* * * * *